INVENTOR.
JAMES E. YOUNG
BY Ronald Zibelli
ATTORNEYS

Nov. 17, 1970 J. E. YOUNG 3,541,248

DOCUMENT ABSTRACTOR WITH HAND-HELD OPTICAL SCANNER WITH CONSTANT RESOLUTION SCANNING

Filed Sept. 29, 1967 3 Sheets-Sheet 2

INVENTOR.
JAMES E. YOUNG
BY Ronald Zibelli
ATTORNEYS

INVENTOR.
JAMES E. YOUNG
BY Ronald Zibelli
ATTORNEYS 3,541,248
Patented Nov. 17, 1970

3,541,248

DOCUMENT ABSTRACTOR WITH HAND-HELD OPTICAL SCANNER WITH CONSTANT RESOLUTION SCANNING

James E. Young, Pittsford, N.Y., assignor to Xerox Corporation, Rochester, N.Y., a corporation of New York Filed Sept. 29, 1967, Ser. No. 671,653
Int. Cl. H04n 5/76, 3/08
U.S. Cl. 178—6.6 15 Claims

ABSTRACT OF THE DISCLOSURE

A recording system employing a hand-held scanner unit wherein a spot of light is moved across the material to be recorded in a direction perpendicular to the direction of movement of the scanner unit and a light chopper or similar device provides signals indicative to the rate at which the scanner unit is moved so as to correlate the movement of the spot of light with the movement of the scanner unit; and a recorder unit employing a similar light spot whose movement is similarly correlated with the movement of the scanner unit wherein the relative movement between a light sensitive medium and the recorder unit is a function of the movement of the scanner unit.

BACKGROUND OF THE INVENTION

This invention relates generally to facsimile recording, and, more specifically, to recording apparatus which includes a graphic information scanning device which may be hand-held during the scanning operation.

A growing need exists for a recording system which is capable of individual use in reproducing graphic information contained in books and the like. Such a system would be highly desirable for use by students, researchers, and lawyers who many times wish to extract verbatim portions of text from books and other sources of information which, because of their nature, may not be removed from their particular place of retention. An example of this would be rare books or reference books kept by libraries, trial records in judicial archives, title abstracts, and other legal records generally retained in the custody of local governmental officials.

To manually transcribe the desired portions of such texts is a tedious and time-consuming process which is always susceptible to error in the transcription. These problems related to manual transcription have been recognized by the appearance of many types of photocopying or xerographic reproducing machines in libraries and other places where copies from books and the like are desirable. However, such machines, because of their size and expense are centrally located and materials to be copied must be taken to them if copies are to be made. This takes time so that the material being copied is not available to others who may want to see the material themselves.

In addition, these machines cannot copy selective portions of a printed page and must reproduce the entire page. Oftentimes, too, such reproducing machines are not available in places where certain people may want to make copies of graphic information.

The solution to the problems inherent in copying only selected portions of a book's page or pages at the situs of the book has been attempted in the form of a highly portable system which includes a hand-held scanner. This scanner is moved preferably in the direction of a line of print, for example, of which a copy is desired by the person holding the scanner unit. The scanner unit itself is simple enough since it contains essentially a light source, an oscillating mirror, a light sensitive element, and the necessary electrical connections to power supplied and actuating signals which are needed to oscillate the mirror and to detect the reflected light from the material being scanned. The recorder of this system is a device, very similar to the scanner, which directs a modulated light beam onto a light sensitive medium leaving a visible record of what the scanner unit has scanned. The recording medium has generally taken the form of a tape which moved under the recorder unit. The motion of the scanner unit is monitored in such a manner as to enable the synchronization of the tape's movement with that of the scanner unit's motion over the original material. In this manner, expansion or compression of the reproduced material will not result if the individual copying material moves the scanner unit faster or slower, respectively, than the recording tape passes the recorder unit.

This solution, however, is deficient in many respects. Basic to this deficiency is the assumption that the person holding the scanner unit will always move the unit within the same range of speeds. This range of speeds is very narrow and must be a strict prerequisite when using such prior art recording systems since the oscillating mirror in the scanner unit and its counterpart generally found in the recorder unit are actuated in such a manner as to oscillate at a common single frequency, such as 60 hertz.

Therefore, assuming this is the particular frequency employed, one person may move the scanner unit at a speed so that along a one inch pass of the scanner unit the original material may be scanned thirty times. Another individual, using the device for the first time for instance, may move the scanner unit at a slower speed thereby resulting in sixty scans of the same one inch of original material.

This variation in the number of scans per length results in a degrading variation in the resultant reproduction. Besides the obvious possibility of different scanner unit speeds with different operators, it is difficult to expect that any one individual would be able to maintain a uniform speed in moving the scanner unit even along a single line of print. A certain period of acceleration and deceleration must occur at the beginning and ending of each scanner unit movement. In addition, a person who is using the scanner unit over a prolonged continuous period may very well tend to alter the speed of this movement as he tires. Also, the length of the pass of the scanner unit may encourage a variation in speed of the unit's movement. For example, original material composed of relatively short lines of information may be scanned at a very slow uniform rate easily controlled by the operator. At the same time, if the original material is composed of relatively long lines of print, the operator may tend to move the scanner unit at a faster speed in view of the length of the material to be scanned.

Another prior art obstacle has been that of coping with the scanning light of the scanner unit when a person is repositioning the unit from the end of one line of original material to the beginning of the next line to be copied. Unless the light is extinguished or the power to the system interrupted, the recorder may reproduce undesirable marks on the recording medium between lines of the copy. A switch on the scanner unit which is operator actuated whenever no scanning is desired is cumbersome when there are short lines of original to be copied and makes use of such a system less attractive.

All of these reasons point to the desirability of maintaining the actual scanning rate of the exploring light spot over the material to be copied compatible with good quality reproduction in the recorder. This can be accomplished in accordance with the principles of the present invention by providing a relationship between this scanning rate and the speed at which the scanner unit is moved by the operator across the original material.

Therefore, it is an object of the present invention to improve graphic information recording.

It is another object of the present invention to provide an improved portable recording system using a hand-held scanner wherein high quality reproduction is possible independent of the speed at which the scanner is moved across an original.

It is a still further object of the present invention to provide an improved portable recording system wherein the scanning action in the scanner unit and recorder unit is synchronized with the movement of the scanner unit across the graphic information to be reproduced.

Another object of the present invention is to provide an improved hand-held optical scanner unit wherein the scanning action is a function of the speed at which the scanner unit moves over material to be scanned.

Yet another object of the present invention is to provide an improved scanner unit wherein the scanning action is terminated when the scanner unit is stopped relative to the material being scanned.

These objects and others which may become apparent are accomplished in accordance with the principles of the present invention wherein a recording system employs a hand-held scanner unit and a recorder unit wherein a spot of light is moved across the material to be copied and a light sensitive medium, respectively, and the scanning of such a spot of light is correlated with the movement of the scanner unit across the material to be copied. This correlation which also influences the relative movement between the light sensitive medium and the recorder unit is achieved by a light chopper or similar device which generates signals indicative of the rate of travel of the scanner unit across the original material being scanned.

These objects and other advantageous features of the present invention may be better understood from a reading of the following description when read in connection with the accompanying drawings wherein.

Figure 1:
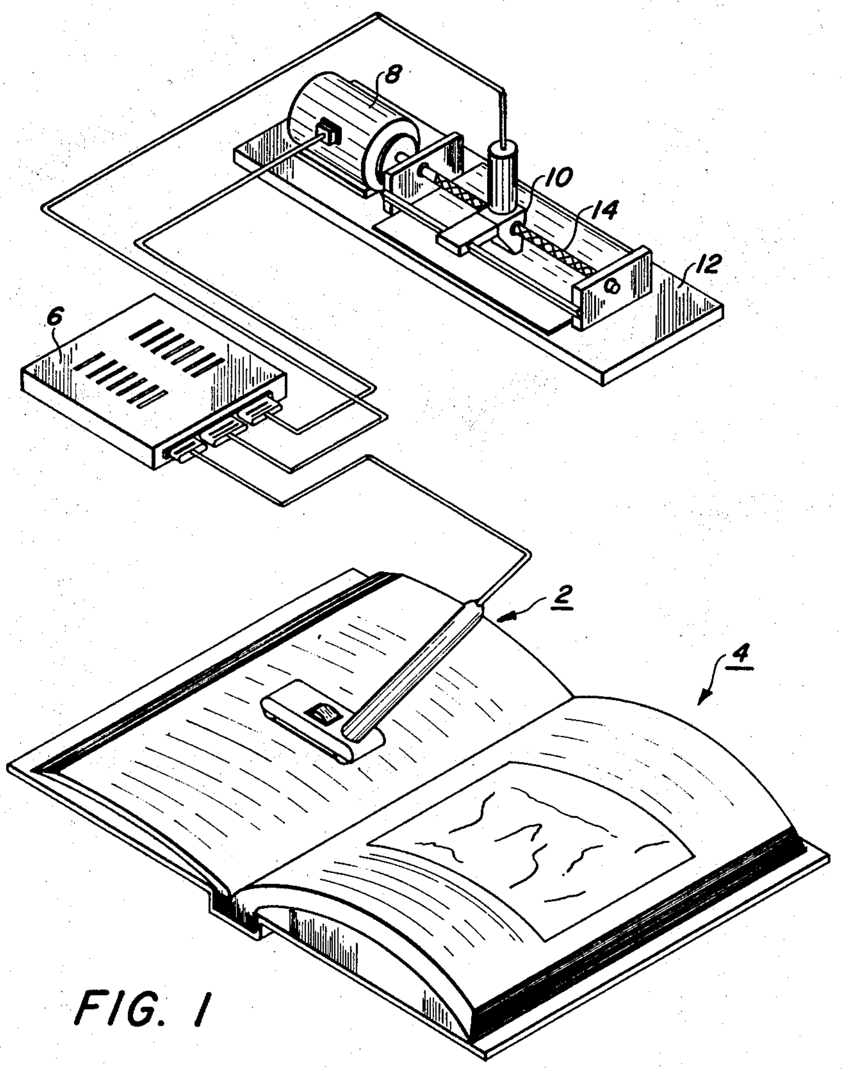
FIG. 1 shows a perspective view of the present facsimile recording system of the present invention.

Referring specifically to FIG. 1, there is illustrated the complete system in accordance with the present invention. A hand-held scanner unit, generally designated by the reference numeral 2, is positioned on a source of graphic information, for example, a page of a book 4, and may be moved preferably in the direction of the line of print.

This scanner unit is connected electrically to suitable electronics, for example, in the housing 6. Electrical connections are supplied from this housing to motor 8 and to a recorder unit 10 associated with the recording apparatus. A more detailed discussion of the electronics is provided hereinafter in connection to FIG. 7.

The recorder system includes a recording unit 10 which is adapted to move across a suitable recording medium 12 which may be sensitive to light to provide visible marks thereon. This movement of the recorder unit may be accomplished by its cooperation with a lead screw 14 connected to the motor 8 and driven thereby. The recording medium 12 may be selectively indexed for each movement of the recorder unit thereacross. Techniques for accomplishing this indexing are well known in the art and therefore will not be described in this disclosure.

In operation, as will be more fully explained hereinafter, the scanner unit 1 is manually moved across and in contact with material to be copied effecting a plurality of scans of light thereacross. This light is reflected depending upon the informational content being scanned and detected by a suitable photosensitive member such as a photocell. This generally provides a video signal which may then be suitably amplified and coupled to modulate the light source in the recorder unit which utilizes a similar scanning motion as the scanner unit to provide visible marks on the recording medium in accordance with the informational content being scanned.

Figures 2, 3, 4:
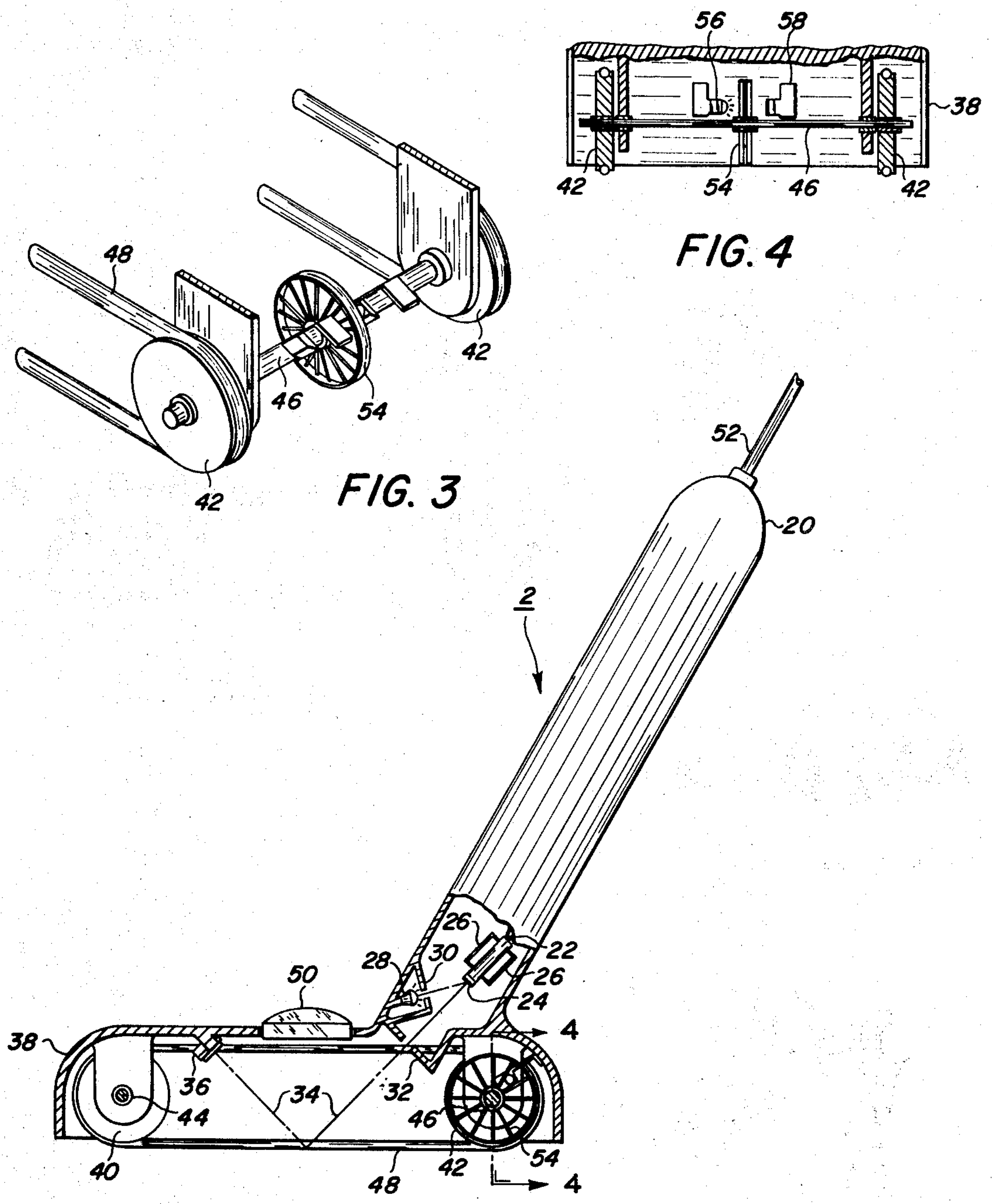
FIG. 2 illustrates in cross section the scanner unit depicted in FIG. 1 in accordance with the principles of the present invention.
FIG. 3 shows a partial perspective view of the synchronizing wheel of the scanner of FIG. 2.
FIG. 4 shows another view of the synchronizing wheel and related structure.

To better understand this operation, reference is now made to FIG. 2 which illustrates in cross section the scanner unit 2. A tubular member 20 houses generally the scanning element 22 which, for purposes of description, may be a piezoelectric member having a mirror or other reflective surface 24 fixed at one end thereof.

The other end of the scanning element 22 may be suitably fixed to the tubular member 20. This scanning member may be made up of two different thin strips of piezoelectric materials, bonded together. Upon the application of a suitable voltage pulse applied to electrodes 26 associated with the scanner, one strip increases in length and the other becomes shorter thereby moving the reflective surface or mirror 24 to provide a linear scan of light being reflected from this mirror. The actual nature of this scanning action may better be understood with reference to FIG. 6. This figure shows a plurality of scans in a vertical direction across a horizontal character line. The direction of movement of the scanner unit is designated by the arrow.

In the scanner unit of FIG. 2, light is provided by suitable light source 28 through an optical apertured member 30 and is reflected by the mirror 24 on the piezoelectric scanner element 22 through a limiting slit 32 onto the material to be copied.

This slit has its longer dimension in a direction perpendicular to the plane of the drawing and is sufficient to permit a scan swath of the desired length.

This interrogating light spot is reflected from the surface of the material to be copied as shown by the line 34 and these reflections are detected by a suitable photocell 36. The photocell 36 is enclosed in a housing portion 38 of the scanner unit which acts to exclude most ambient light. This housing is suitably attached to the tubular member 20 to provide a rigid unitary structure.

Also in this housing 38 there is located two pairs of pulley type rollers 40 and 42 mounted on two shafts 44 and 46, respectively. These shafts are mechanically coupled to the housing 38 to permit the scanner unit to be moved as these rollers turn in frictional engagement with the material across which the scanner unit is being moved. To assist in this, rubber tracks 48 are provided around respective pulleys in each pair. These rubber tracks also serve to maintain the material being copied in a flat condition preventing distortion of the reflected light spot.

The scanner unit 2 may also be provided with a magnifying member 50 positioned in an aperture of the housing 38 to permit the operator to monitor the material being scanned.

FIG. 2 does not illustrate the electrical connections involved with the structure of the scanner unit to permit the figure to be simply presented. However, it will be realized that a source of operating potential must be supplied to the light source 28 and the video photocell 36 as well as actuating signals provided to the electrodes 26 associated with the piezoelectric scanning element 22. These connections may be made through a suitable multiconductor cable coupled through the top of the tubular member 20 as depicted by the reference numeral 52.

Fixed to shaft 46 and positioned intermediate pulley rollers 42 there is a spoked-wheel 54. This may be better seen in FIGS. 3 and 4 to which reference will now be made.

As shown in these figures, a spoked-wheel 54 is connected near the mid-point of the shaft 46 so as to rotate in synchronism with the rotation of the pulley rollers 42. In this manner, as the operator moves the scanner unit across material to be copied, the spoked-wheel rotates as a function of this movement. Referring now specifically to FIG. 4, there may be attached to the housing 38 a simple light source 56 and a photocell 58 which cooperate together to monitor the rotation of the spoked-wheel 54. This may be seen when it is understood that as the spoked-wheel rotates along with shaft 46 the light path between the photocell 58 and the light source 56 is interrupted by the spokes at a frequency which is a function of the rotational speed of this wheel 54. This rotational speed is directly related to the speed at which the scanner unit is moved by the operator. It should also be noted that if the scanner unit is stopped on the surface of the material to be copied or is lifted therefrom, no movement of the spoked-wheel and, hence, the scanner unit, will be detected by the light source 56-photocell 58 combination.

Figure 5:
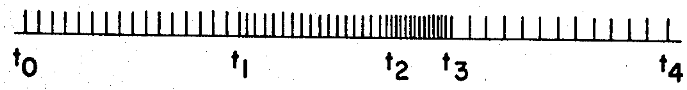
FIG. 5 shows a waveform diagram representative of the operation of the synchronizing wheel of FIG. 3.

The results of the monitoring by the photocell 58 and light source 56 in the scanner unit 2 can be seen in FIG. 5 which depicts an idealized waveform output of the photocell 58. This waveform of FIG. 5 shows four speeds of scanner unit movement across material to be scanned and copied. The speed of the scanner unit across the material to be copied is varied from period to period as shown in FIG. 5. For example, from time $t_0$ to $t_1$ the movement is uniform at one particular speed. From times $t_1$ to $t_2$, $t_2$ to $t_3$, and $t_3$ to $t_4$, the scanner unit is moved, respectively, at different but uniform speeds. Time $t_2$ to $t_3$ indicates a period at which the scanner unit is moved the fastest, indicated by the highest frequency pulses. Time $t_3$ to $t_4$ represents a much slower speed and the slowest of the four speeds depicted in FIG. 5.

Figure 6:
FIG. 6 depicts the scanning technique utilized in the scanner of FIG 2.

As noted in the introduction, the speed of scanner unit in the prior art devices substantially effects the number of scans which the scanner unit may perform on a particular segment of graphic information. FIG. 6 illustrates, as noted hereinabove, the manner of scan accomplished by the piezoelectric element 22 in the scanner unit of FIG. 2. As this figure depicts, ideally the scanning rate is uniform and each scan is uniformly displaced from an adjacent and preceding scan. In accordance with the principles of the present invention, these scan lines remain uniformly spaced and of an equal spacing relative to the material being scanned regardless of the speed at which the scanner unit is being moved across this material. Therefore, the scanning pattern illustrated in FIG. 6 will be substantially the same for any of the four speeds depicted in FIG. 5 by the output pulses from the photodetector 58 monitoring the rotational speed of the spoked-wheel 54.

This may be better understood when considering the output of the monitoring or synchronizing photocell 58 as the frequency of scans required at the particular scanner unit speed to result in a constant number of scans per unit length or distance that the scanner unit is moved. In other words, if the speed of the scanner unit is represented in terms to time (T) per length (L) or distance (through which the scanner unit is moved by the operator) and the output of the synchronizing photocell 58 as a number of scans (S) per time ($t$), then the equation $(T/L)\times(S/t)$ should always equal a constant number of scans per length of scanner unit movement. Therefore, for a period, such as $t_2-t_3$, at a high scanner unit speed and, hence a lower $T/L$, the number of scans per time $S/t$ increases as shown in FIG. 5. In this manner, the rotational speed and number of spokes of wheel 54 may be chosen so that the output of photocell 54 is of the requisite frequency to insure a constant number of scans per length regardless of scanner unit speed.

Figure 7:
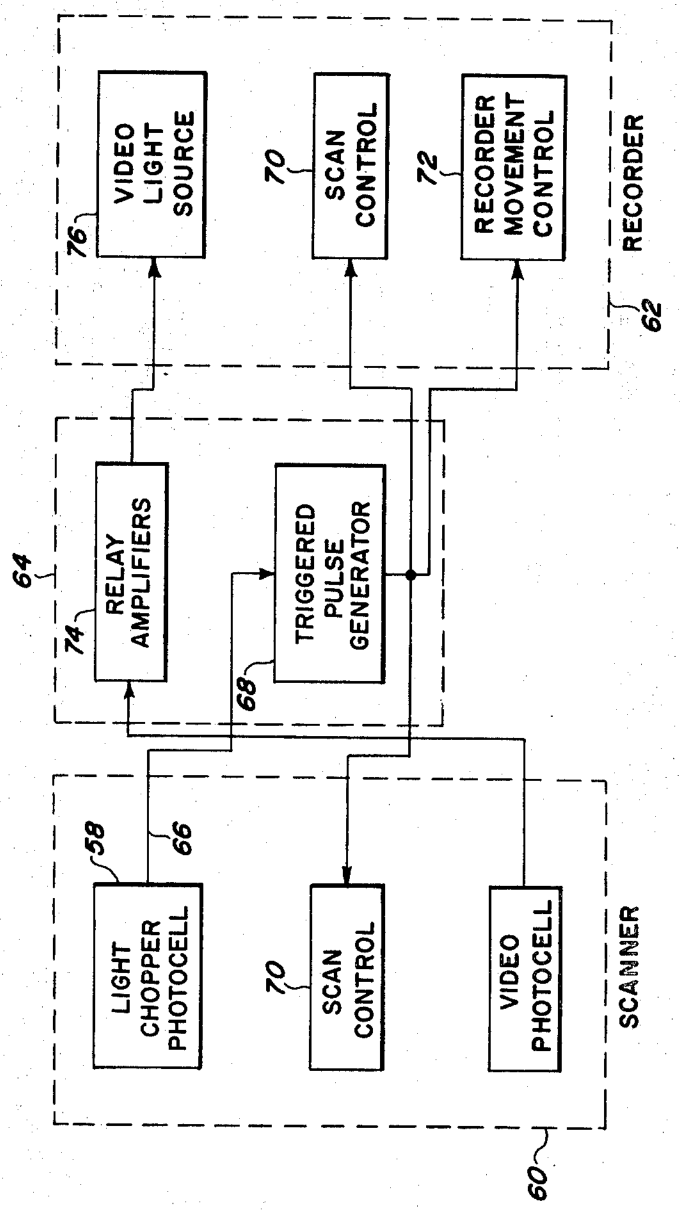
FIG. 7 illustrates in block diagram the circuit used with the present invention.

When this spoked-wheel monitoring system is coupled to a suitable circuit as shown in block diagram in FIG. 7 this ideal operation and the necessary uniform number of scans per length regardless of speed of the scanner unit may be accomplished. Before a detailed description of the circuit of FIG. 7 is given, it should be realized that the structure of the recorder unit 10 is very similar to that of the scanner unit with the omission of the video photocell 36, the magnifying element 50, and optionally, the sets of pulley rollers 40 and 42 and the spoked wheel 54. Also, as will be described hereinafter, the light source in the recorder unit 10, unlike light source 28 in the scanner unit, is modulated. Referring now to FIG. 7, broken line 60 designates the elements of the scanner unit 2 while broken line 62 designates the corresponding elements of the recorder station. Broken line 64 represents generally the electronics enclosed in housing 6 previously referred to in FIG. 1.

One of the advantages of the present invention is the synchronization of the scanning in both the scanner and recorder units with the motion of the scanner unit across material being scanned for reproduction. This advantage insures quality reproduction of material being scanned independent of the speed or variation in speed at which the scanner unit is moved by an operator.

In order to achieve this advantage, the spoked-wheel 54 is utilized to generate a pulse train, the pulse repetition frequency of which is a function of the speed at which the scanner unit is being moved. These pulses are utilized to trigger a pulse generator which produces scan signals to the scanning elements in both the scanner unit and recorder unit. As shown in FIG. 7, the output from the spoked-wheel photocell 58 generally designated 66 is provided as an input to the triggered pulse generator 68. This generator has three outputs which are connected respectively to the scan control 70 in the scanner unit and the recorder unit, and the recorder movement control generally designated 72.

These scan controls 70 in the scanner and recorder unit refer generally to electrodes, such as electrodes 26 in FIG. 2 to which pulses may be supplied to effect movement of the scanning element 22.

The nature of the pulse generator may take various forms. It may constitute a conventional sawtooth generator capable of the frequencies desired so as to produce one sawtooth per pulse in the pulse train from the synchronization photocell 58. Also, it may include a high frequency oscillator, the output of which is gated with the output of the spoked-wheel photocell 58. Generally, however, the nature of this pulse generator 68 is such as to produce a predetermined pulse for each pulse received from the photocell 58 associated with the spoked wheel 54. In the scan control of the scanner and recorder units, these pulses from the pulse generator 68 serve to deflect the light spot across the original material or copy material constituting one scan line.

The recorder movement control 72 may be a conventional integrating circuit for providing an analog voltage signal indicative of the frequency of the pulse train from the output of the photocell 58. This analog signal may then be supplied to a conventional astable multivibrator, the frequency of which is controlled by this analog signal. The multivibrator's output may then supply power to a motor such as the motor 8 in FIG. 1 to drive the lead screw 14 and hence the recorder unit 10 at a speed which is a function of the frequency of the pulses received by the integrating circuit from the photocell 58. This particular part of the invention is not significant per se and may take several conventional forms of implementation.

FIG. 7 also shows the connection of the video photocell 36 in the scanner unit via a block 74 which may contain suitable amplifiers and a relay to the video light source 76 in the recorder unit 10. As the video photocell detects the absence of reflected light, the signal may be generated and amplified to actuate the relay to supply voltage to the light source 76 in the recorder unit 10. As the video photocell detects the absence of reflected light, the signal may be generated and amplified to actuate the relay to supply voltage to the light source in the recorder so that a mark is made accordingly on the recording medium. Similarly, when the photocell 36 detects full reflection of light from a white surface, the relay may be de-energized to interrupt voltage to the video light source.

From this description, it should be realized that the present invention provides a novel means for selectively reproducing portions of graphic information in a portable manner wherein the speed at which a scanner unit is manually moved across material to be copied does not effect the quality of the reproduction of this material. In addition, where each scanning stroke in the scanner unit and recorder unit is controlled by movement of the spoked-wheel 54, lifting of the scanner unit from the material to be copied does not result in spurious markings on the recording medium since a new scan in the recorder is not initiated. This same statement is true when the scanner unit is at rest.

Therefore, while the invention has been described with reference to the specific embodiment disclosed herein, it is not confined to the details set forth herein since it is apparent that certain electrical and mechanical equivalents may be substituted for the components of the preferred embodiment without departing from the scope of the invention. Thus, for example, while a piezoelectric scanning element has been disclosed, the concept of the present invention is equally applicable to a galvonic or vibrating mirror or prism to effect the scanning light. Similarly, although the recorder unit has been disclosed as moving relative to a fixed recording medium, the recorder may be fixed while the recording medium is moved and controlled by the spoked-wheel 54 in the scanner unit.

Also, while for purposes of disclosure a spoked-wheel light chopper has been described for generating a pulse train which is a function of the speed at which the scanner unit is moved across material to be copied, it should be realized that other variations, such as apertured discs, magnetic sensing devices, or a rotating armature-commutator, are also possible to accomplish the same result.

While a light sensitive recording medium has been disclosed regarding the application of the present invention, it is equally adaptable to current or electrostatic charge sensitive recording medium wherein the recorder utilizes an electrode which is vibrated in synchronism with the scanner action in the scanner unit.

Further, it should also be understood that, although the scanner unit and spoked-wheel have been described in a facsimile recording system, it will be apparent to those skilled in the art that this scanner unit has also other useful applications in other systems.

Also, while housing 38 is disclosed as having an opening therein to allow transmission of light to and from the material being scanned, it should be understood that this opening may actually be closed with a suitable material, such as glass, which will still permit this transmission. Reference in the claims to an optical opening is intended to be generic to all such openings.

Therefore, the intention is to cover such modifications or changes as may come within the scope of the invention as defined by the following claims.

What is claimed is:

1. A facsimile recording system comprising:

(a) a recording medium;

(b) recorder means for making visible marks on said recording medium in response to electrical signals;

(c) recorder movement control means for controlling the relative movement between said recorder means and said recording medium;

(d) a scanner unit adapted to be moved across material to be recorded having:

(1) a housing with an opening therein;

(2) a source of light fixed to said housing;

(3) scan means for moving said light across said opening;

(4) photosensitive means fixed to said housing and positioned to detect the reflections of said moving light from said material to be recorded for generating electrical signals representative of the portions of said material reflecting said moving light, and (5) synchronizing means fixed to said housing for controlling said scan means as a function of the speed at which said scanner unit is moved across said material.

2. A system as defined in claim 1 wherein said recorder means includes a scanning means for moving a recording element across said recording medium and further including a scan control means coupled to said synchronizing means for controlling said scanning means as a function of the speed at which said scanner unit is moved across said material.

3. A system as defined in claim 1 wherein said recorder movement control means is coupled to said synchronizing means and responsive thereto for controlling the said relative movement as a function of the speed at which said scanner unit is moved across said material.

4. A recording system for graphic information comprising a scanner unit including:

(a) a movable housing having an opening therein;

(b) light means in said housing for producing a light spot at said opening;

(c) scan control means coupled to said housing for generating a scan control signal as a function of the movement of said scanner unit across said graphic information;

(d) scan means responsive to said scan control signal for moving said light spot across said opening; and (e) photosensitive means in said housing for generating electrical signals in response to reflections of said light spot from said graphic information.

5. A recording system as defined in claim 4 further comprising:

(a) a recording medium; and (b) a recorder unit including:

scan means coupled to said scan control means and said photosensitive means for moving a recording element across said recording medium in response to said scan control signal and in cooperable relation with said recording medium in response to said electrical signals.

6. A recording system as defined in claim 5 further including movement control means rseponsive to said scan control signal for producing relative movement between said recorder unit and said recording medium as a function of the movement of said scanner unit.

7. An optical scanning system for scanning graphic information with a portable hand-held scanner unit at a constant rate of K scans per distance of movement of said scanner unit over said graphic information independent of the speed S of said movement; said system comprising:

(a) a portable hand-held housing having an optical opening therein;

(b) means in said housing for producing a light spot at said opening;

(c) scan control means coupled to said housing for generating a scan control signal at a frequency $f$ such that $f=SK$.

(d) scanning means for moving said light spot across said opening for one scan cycle in response to one scan control signal.

8. A scanner unit for generating electrical signals in response to light reflections from graphic information comprising:

(a) a housing adapted to be manually moved across graphic information;
(b) scan control means coupled to said housing for generating a scan control signal as a function of the movement of said housing across said graphic information;
(c) scan means in said housing responsive to said scan control signal for scanning said graphic information.

9. A scanner unit as defined in claim 8 wherein said scan means includes at least one photosensitive element and means for selectively energizing said photosensitive element in response to said scan control signal.

10. A scanner unit as defined in claim 8 wherein said scan means includes a photosensitive element and means for making said photosensitive element responsive to light reflections from sequential areas of said graphic information.

11. A scanner unit as defined in claim 9 wherein said scan control signal includes a pulse which occurs at a frequency proportional to the speed of said movement.

12. A scanner unit as defined in claim 10 wherein said scan control signal includes a pulse which occurs at a frequency proportional to the speed of said movement.

13. A scanner unit comprising:
(a) a movable housing having an opening therein;
(b) light means in said housing for producing a light spot at said opening;
(c) scan control means coupled to said housing for generating a scan control signal as a function of the movement of said housing across said graphic information;
(d) scan means responsive to said scan control signal for moving said light spot across said opening; and
(e) photosensitive means in said housing for generating electrical signals in response to reflections of said light spot from said graphic information.

14. A facsimile recording system for recording marks on a recording medium comprising:
(a) recorder means for making visible marks on a recording medium in response to electrical signals;
(b) recorder movement control means for controlling the relative movement between said recorder means and said recording medium;
(c) a scanner unit adapted to be moved across material to be recorded having:
(1) a housing with an optical opening therein;

(2) a source of light fixed to said housing;
(3) scan means for moving said light across said opening;
(4) photosensitive means fixed to said housing and positioned to detect the reflections of said moving light from said material to be recorded for generating electrical signals representative of the portions of said material reflecting said moving light, and
(5) synchronizing means fixed to said housing for controlling said scan means as a function of the speed at which said scanner unit is moved across said material.

15. An optical scanning system for scanning graphic information with a portable hand-held scanner unit in which the resolution of the scanned graphic information is held constant over a varying range of scanning speeds by scanning at a rate of K scans per distance of movement of said scanner unit over said graphic information independent of the speed S of said movement, said system comprising:
(a) a portable hand-held housing having an optical opening therein;
(b) scan control means coupled to said housing for generating a scan control signal at a frequency $f$ such that $f=SK$.
(c) scanning means for scanning the graphic information at said opening in one scan cycle in response to one scan control signal.

References Cited

UNITED STATES PATENTS

| | | | |
|---|---|---|---|
| 2,465,898 | 3/1949 | Martin | 178—7.6 |
| 3,064,078 | 11/1962 | Garfield | 178—7.6 |
| 3,318,996 | 4/1967 | Garfield et al. | |
| 3,346,692 | 10/1967 | Garfield et al. | |
| 3,351,744 | 11/1967 | Masterson | 250—233 X |
| 3,361,896 | 1/1968 | Antonio. | |

RICHARD MURRAY, Primary Examiner

DONALD E. STOUT, Assistant Examiner

U.S. Cl. X.R.

178—7.6